United States Patent
Ishimaru

(10) Patent No.: US 10,192,203 B2
(45) Date of Patent: Jan. 29, 2019

(54) MAINTENANCE SUPPORT SYSTEM, SERVICE PROVIDING METHOD, AND AUTHENTICATION DEVICE

(71) Applicant: Oki Data Corporation, Tokyo (JP)

(72) Inventor: Masaaki Ishimaru, Tokyo (JP)

(73) Assignee: Oki Data Corporation, Tokyo (JP)

( * ) Notice: Subject to any disclaimer, the term of this patent is extended or adjusted under 35 U.S.C. 154(b) by 356 days.

(21) Appl. No.: 15/002,355

(22) Filed: Jan. 20, 2016

(65) Prior Publication Data

US 2016/0224947 A1 Aug. 4, 2016

(30) Foreign Application Priority Data

Jan. 30, 2015 (JP) .................................. 2015-017147

(51) Int. Cl.
*G06K 15/00* (2006.01)
*G06Q 10/00* (2012.01)
*G06F 21/60* (2013.01)
*H04N 1/00* (2006.01)
*H04N 1/44* (2006.01)

(52) U.S. Cl.
CPC ........... *G06Q 10/20* (2013.01); *G06F 21/608* (2013.01); *H04N 1/00344* (2013.01); *H04N 1/4406* (2013.01)

(58) Field of Classification Search
CPC .. G06Q 10/20; H04N 1/00344; H04N 1/4406; G06F 21/608
USPC ...................................................... 358/1.14
See application file for complete search history.

(56) References Cited

U.S. PATENT DOCUMENTS

| | | | | |
|---|---|---|---|---|
| 2012/0079081 A1* | 3/2012 | Parks | ..................... | G06F 3/1204 709/220 |
| 2012/0127525 A1* | 5/2012 | Uchibori | ............... | G06F 3/1204 358/1.15 |
| 2015/0029535 A1* | 1/2015 | Kondoh | ................ | G06F 21/608 358/1.14 |

FOREIGN PATENT DOCUMENTS

| | | |
|---|---|---|
| EP | 1310862 A2 | 5/2003 |
| EP | 2573979 A1 | 3/2013 |
| JP | 2010-081555 A | 4/2010 |

* cited by examiner

*Primary Examiner* — Neil R McLean
(74) *Attorney, Agent, or Firm* — Rabin & Berdo, P.C.

(57) ABSTRACT

A maintenance support system includes an image forming apparatus, a management device, and an information processing terminal. The image forming apparatus generates data including terminal identification information identifying the terminal and sends it to the management device. The management device includes: an issuing processor that, upon receiving the data, issues receipt identification information and sends it to the image forming apparatus or terminal; a memory that stores the terminal identification information in the data and the receipt identification information; and a processor that, upon receiving the terminal identification information and receipt identification information from the terminal, compares the received terminal identification information and receipt identification information with the terminal identification information and receipt identification information stored in the memory, and outputs a result of the comparison. The terminal receives the receipt identification information, and sends the received receipt identification information and the terminal identification information.

19 Claims, 7 Drawing Sheets

MAINTENANCE SUPPORT SYSTEM, SERVICE PROVIDING METHOD, AND AUTHENTICATION DEVICE

BACKGROUND OF THE INVENTION

1. Field of the Invention

The present invention relates to a maintenance support system, a service providing method, and an authentication device, and more particularly, to a maintenance support system for providing a service for supporting maintenance of a multi-function peripheral (MFP).

2. Description of the Related Art

Japanese Patent Application Publication No. 2010-81555 discloses an image forming system including an image forming apparatus and a maintenance/management server. The image forming apparatus stores history information indicating a history of operation of the image forming apparatus, and when detecting a failure, generates failure report information including items and values that are included in the history information and selected by a user, and sends it to the maintenance/management server. This makes it possible to send failure report information to the server while preventing user information from leaking without authorization by the user.

In a system for providing a service for supporting maintenance of an image forming apparatus to a user, it is desirable to prevent the service from being used by another person other than the user. It is also desirable to allow the user to easily use the service.

SUMMARY OF THE INVENTION

An aspect of the present invention is intended to provide a maintenance support system, a service providing method, and an authentication device capable of providing secure authentication.

According to an aspect of the present invention, there is provided a maintenance support system for providing a service for supporting maintenance of an image forming apparatus. The maintenance support system includes: the image forming apparatus; a management device; and an information processing terminal. The image forming apparatus includes: a first memory configured to store terminal identification information identifying the information processing terminal; and a service request data generator configured to generate service request data including the terminal identification information stored in the first memory and send the service request data to the management device. The management device includes: an information issuing processor configured to, upon receiving the service request data sent from the image forming apparatus, issue receipt identification information and send the receipt identification information to the image forming apparatus or the information processing terminal; a second memory configured to store the terminal identification information included in the service request data and the receipt identification information issued by the information issuing processor in association with each other; and a processor configured to, upon receiving the terminal identification information and the receipt identification information sent from the information processing terminal, compare the received terminal identification information and receipt identification information with the terminal identification information and receipt identification information stored in the second memory in association with each other, and output a result of the comparison. The information processing terminal includes: a third memory configured to store the terminal identification information; an interface configured to receive input of the receipt identification information in accordance with operation by a user; and a transmitter configured to send the received receipt identification information and the terminal, identification information stored in the third memory to an outside of the information processing terminal.

According to another aspect of the present invention, there is provided a service providing method of providing, by a maintenance support system including an image forming apparatus, a management device, and an information processing terminal, a service for supporting maintenance of the image forming apparatus. The service providing method includes: by the image forming apparatus, generating service request data including terminal identification information that identifies the information processing terminal and is stored in a first memory, and sending the service request data to the management device; by the management device, upon receiving the service request data sent from the image forming apparatus, issuing receipt identification information, sending the receipt identification information to the image forming apparatus or the information processing terminal, and storing in a second memory the terminal identification information included in the service request data and the receipt identification information in association with each other; by the information processing terminal, receiving input of the receipt identification information in accordance with operation by a user, and sending the received receipt identification information and the terminal identification information stored in a third memory to an outside of the information processing terminal; and by the management device, upon receiving the terminal identification information and the receipt identification information sent from the information processing terminal, comparing the received terminal identification information and receipt identification information with the terminal identification information and receipt identification information stored in the second memory in association with each other, and outputting a result of the comparison.

According to another aspect of the present invention, there is provided an authentication device for authenticating a communication device. The authentication device includes: a receiver configured to receive device information of the communication device and receipt information sent from the communication device; and an authentication processor configured to authenticate the communication device based on the received device information and receipt information.

DETAILED DESCRIPTION OF THE INVENTION

Figure 1:
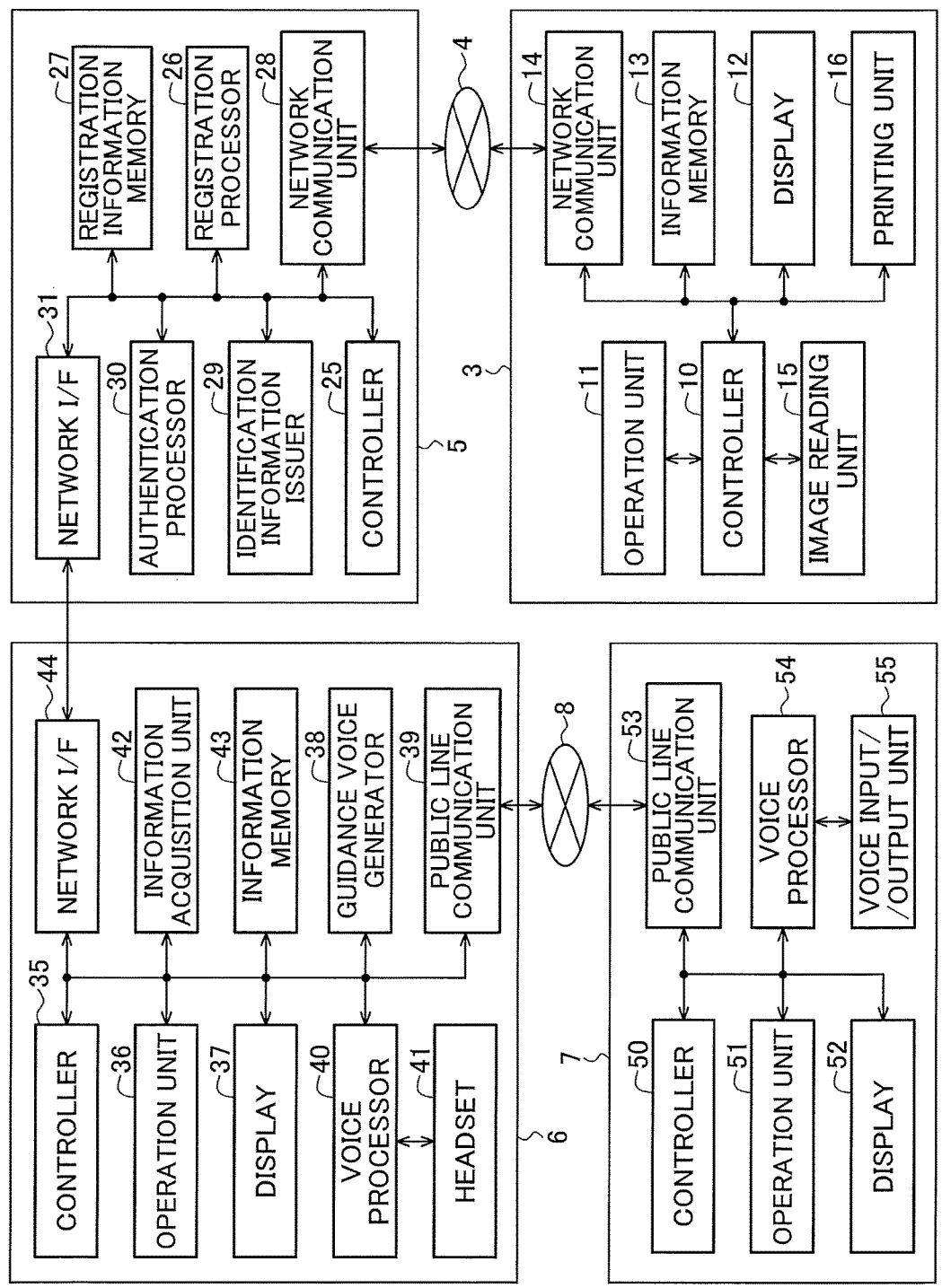
FIG. 1 is a block diagram illustrating a configuration of a maintenance support system according to an embodiment of the present invention.

An embodiment of the present invention will now be described with reference to the attached drawings.
(1) Embodiment
(1-1) Configuration of Maintenance Support System FIG. 1 illustrates a maintenance support system 1 of the present embodiment. The maintenance support system 1 includes a multi-function peripheral (MFP) 3 as an image forming apparatus used by a user and a management server 5 as a management device (or authentication device) managed by a manufacturer of the MFP 3 (also referred to below as the MFP manufacturer), for example. The MFP 3 is communicably connected to the management server 5 via a network 4, such as the Internet. The maintenance support system 1 also includes a support device 6 as an information acquisition device located at a support center managed by the MFP manufacturer, for example. The support device 6 is communicably connected to the management server 5 via a predetermined communication medium, such as a local area network (LAN). When a trouble, such as a failure or malfunction, occurs in the MFP 3 of the user, the maintenance support system 1 allows a smartphone 7, which has functions of both a mobile phone and a mobile information terminal, as a communication device (or information processing terminal) used by the user to connect to the support device 6 via a public line 8, thereby allowing the user to talk with an operator at the support center, a maintenance worker, or the like on the telephone. Thereby, the maintenance support system 1 allows the operator or maintenance worker to teach the user how to resolve the trouble in the MFP 3 and instruct the user to operate the MFP 3, thereby resolving the trouble in the MFP 3. At this time, in response to operation of the support device 6 by the operator, the management server 5 may remotely operate the MFP 3 to perform various processes. As such, the maintenance support system 1 provides the user with a service (also referred to below as the maintenance support service) for supporting maintenance of the MFP 3.

The MFP 3 includes a controller 10, which is, for example, a microprocessor. The MFP 3 also includes an operation unit (or user interface) 11, a display 12, an information memory 13, a network communication unit (or communication interface) 14, an image reading unit (or image scanner) 15, and a printing unit (or print engine) 16, which are connected to the controller 10. The operation unit 11 includes multiple push-operable operation keys. The display 12 has a touch screen capable of displaying various screens and receiving touch operations on its surface. The information memory 13 is a hard disk drive, a semiconductor memory, or the like. The network communication unit 14 is for communicating with the management server 5. The image reading unit 15 reads an image from a surface of a medium, such as paper or film. The printing unit 16 forms a printed image on a surface of a medium, such as paper or film. The controller 10 reads various programs, such as a basic program, a registration request processing program, and a service request processing program, previously stored in a memory in the controller 10 or the information memory 13. In accordance with the read various programs, the controller 10 controls the entire MFP 3, and performs predetermined arithmetic processes and various processes corresponding to operation instructions input by a user through the operation unit 11 or display 12. Thereby, for example, the controller 10 can cause the image reading unit 15 to read an image from a surface of a medium to generate read image data, and cause the printing unit 16 to form a printed image on a surface of a medium by driving and controlling the printing unit 16 in accordance with the read image data. The controller 10 can also cause the printing unit 16 to form a printed image on a surface of a medium by driving and controlling the printing unit 16 in accordance with image data supplied from a host device (not illustrated), such as an external personal computer. Further, the controller 10 can cause the image reading unit 15 to read an image from a surface of a medium to generate read image data, and send the read image data to a host device. As such, the controller 10 can provide various functions, such as a copying function, a printing function, and an image scanning function.

The information memory 13 previously stores server address information indicating a network address, such as a uniform resource locator (URL), of the management server 5. The server address information is stored in the information memory 13 when the MFP 3 is shipped from the factory, for example. The information memory 13 also stores apparatus unique information that is unique to the MFP 3 and indicates an apparatus serial number or a model name given to the MFP 3 by the MFP manufacturer, an Internet protocol (IP) address or a media access control (MAC) address assigned to the MFP 3, or the like. Further, when the controller 10 receives, from the user via the operation unit 11 or display 12, input of user information, such as a name or residence of the user, it stores the user information in the information memory 13. The user information is input to the controller 10 in initial setting of the MFP 3, for example. Further, the controller 10 stores in the information memory 13 apparatus setting information indicating settings for operation of the MFP 3 for providing the above-described various functions, in or after the initial setting of the MFP 3. When the controller 10 causes the MFP 3 to operate, it stores in the information memory 13 operation history information indicating the content of the operation. In addition, when the controller 10 receives, from a user via the operation unit 11 or display 12, input of communication device identification information (also referred to as communication device unique information or terminal identification information) unique to a communication device used by the user for communication with the MFP manufacturer side, it stores the communication device unique information in the information memory 13. The communication device unique information is input to the controller 10 in the initial setting of the MFP 3, for example. When the communication device of the user communicates with the MFP manufacturer side, which is a communication destination, in order to use the maintenance support service, it automatically sends the communication device unique information to the MFP manufacturer side, thereby allowing the MFP manufacturer side to identify the communication device of the user, which is a communication source. Thus, as described later, the communication device unique information is used by the MFP manufacturer side in an authentication process for determining, when a communication device of a user communicates with the MFP manufacturer side, whether the user using the communication device is a legitimate user who has been authorized to use the maintenance support service and whose request for the maintenance support service has been received. If the communication device used by the user for communication with the MFP manufacturer side is the smartphone 7, which communicates with the support device 6 for telephone conversation as described above, the controller 10 stores, in the information memory 13, as the communication device unique information, a telephone number used by the smartphone 7 in communication for telephone conversation, i.e., a telephone number assigned to the smartphone 7. In addition to the above-described communication for telephone conversation between the smartphone 7 and the support device 6, the maintenance support system 1 may also provide the user with the maintenance support service by communication for communicating e-mail messages between the communication device of the user and the support device 6. The maintenance support system 1 may include, as an information acquisition device managed by the MFP manufacturer side, a web page publication device (or web server) that publishes a web page for providing the service on the network 4, and may also provide the user with the maintenance support service by communication for access from the communication device of the user to the web page of the web page publication device. If the communication device used by the user for communication with the MFP manufacturer side is a device (e.g., the smartphone 7) that sends and receives e-mail messages to and from the support device 6, the controller 10 stores, in the information memory 13, as the communication device unique information, an e-mail address used by the communication device (e.g., smartphone 7) in communication for communicating e-mail messages, i.e., an e-mail address that is obtained by the user and stored in the communication device (e.g., smartphone 7). If the communication device used by the user for communication with the MFP manufacturer side is a device (e.g., a personal computer) that communicates with the web page publication device for access to the web page, the controller 10 stores, in the information memory 13, as the communication device unique information, an IP address and a MAC address used by the communication device (e.g., a personal computer) in communication for access to the web page, i.e., an IP address and a MAC address assigned to the communication device (e.g., a personal computer).

Figure 2:
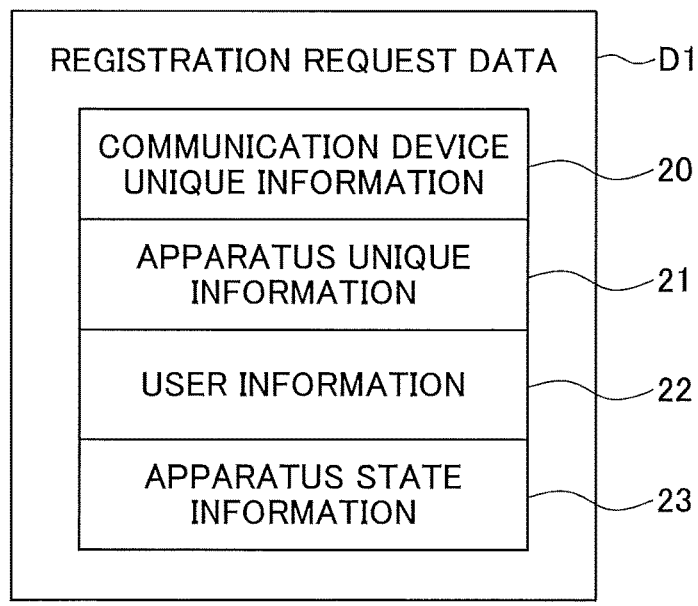
FIG. 2 is a diagram illustrating a configuration of registration request data.

When the controller 10 receives, from a user via the operation unit 11 or display 12, a request for registration with the management server 5 for use of the maintenance support service, it reads from the information memory 13 the communication device unique information, apparatus unique information, and user information, and reads from the information memory 13 the apparatus setting information and operation history information as apparatus state information indicating the current state of the MFP 3. Then, the controller 10 generates registration request data D1 for requesting the management server 5 to register the user and MFP 3. As illustrated in FIG. 2, the registration request data D1 include, as registration information, the communication device unique information 20, apparatus unique information 21, user information 22, and apparatus state information 23. The controller 10 reads the server address information from the information memory 13, establishes a communication connection with the management server 5 via the network communication unit 14 in accordance with the server address information, and sends the registration request data D1 via the network communication unit 14 to the management server 5. In response to the registration request data D1, when the management server 5 completes the registration to authorize the user to use the maintenance support service and then sends registration completion notification screen data for notifying that the registration has been completed and the user has been authorized to use the maintenance support service, the controller 10 receives the registration completion notification screen data via the network communication unit 14. Then, the controller 10 sends the registration completion notification screen data to the display 12 and causes the display 12 to display a registration completion notification screen, thereby notifying the user that the registration with the management server 5 has been completed and the user has been authorized to use the maintenance support service.

Figure 3:
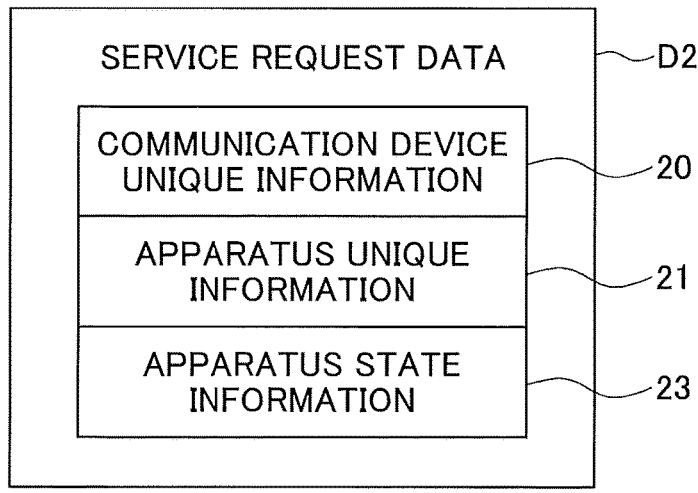
FIG. 3 is a diagram illustrating a configuration of service request data.

The MFP 3 includes various sensors, such as a sensor for detecting the amount of developer for forming printed images, a sensor for detecting whether a medium is jammed during conveyance thereof, and sensors for detecting failures of components. The controller 10 detects, through the various sensors, whether a trouble has occurred in the MFP 3, and if a trouble has occurred, notifies the user of it by displaying an error message on the display 12 or other ways. For example, the operation unit 11 includes a service request key for requesting the maintenance support service. When a trouble occurs in the MFP 3 and the user pushes or operates the service request key to request the maintenance support service, in response to the user's operation, the controller 10 reads from the information memory 13 the communication device unique information and apparatus unique information and reads from the information memory 13 the apparatus setting information and operation history information as apparatus state information. Then, the controller 10 generates service request data D2 for requesting the management server 5 to provide the maintenance support service. As illustrated in FIG. 3, the service request data D2 include, as service request information, the communication device unique information 20, apparatus unique information 21, and apparatus state information 23. The controller 10 reads the server address information from the information memory 13, establishes a communication connection with the management server 5 via the network communication unit 14 in accordance with the server address information, and sends the service request data D2 via the network communication unit 14 to the management server 5. When the management server 5 receives or accepts the request for the maintenance support service from the user based on the service request data D2 sent from the MFP 3, it issues receipt identification information capable of identifying the reception or acceptance, as described later. The receipt identification information consists of, for example, a four-character string. The receipt identification information is for proving that the request for the maintenance support service from the user has already been received. As described later, the receipt identification information is used together with the communication device unique information by the MFP manufacturer side in the authentication process for determining, when a communication device of a user communicates with the MFP manufacturer side, whether the user is a legitimate user who has been authorized to use the maintenance support service and whose request for the maintenance support service has been received. When the management server 5 issues the receipt identification information, it sends the receipt identification information to the MFP 3. For example, the management server 5 sends the MFP 3 receipt identification information notification data for displaying the receipt identification information. When the receipt identification information notification data is sent from the management server 5, the controller 10 receives the receipt identification information notification data via the network communication unit 14. Then, the controller 10 sends the receipt identification information notification data to the display 12 and causes the display 12 to display the receipt identification information, thereby notifying the user of the receipt identification information issued by the management server 5 after receipt of the request for the maintenance support service. As such, the controller 10 can notify the user of the receipt identification information, which is to be used in using the maintenance support service.

The management server 5 includes a controller 25, which is, for example, a microprocessor. The management server 5 also includes a registration processor 26, a registration information memory 27, a network communication unit (or communication interface) 28, an identification information issuer 29, an authentication processor 30, and a network interface 31, which are connected to the controller 25. The registration information memory 27 is a hard disk drive. The network communication unit 28 is for communicating with the MFP 3. The network interface 31 is for communicating with the support device 6. The controller 25 reads various programs, such as a basic program, a registration processing program, an information issuing program, and a user authentication program, previously stored in a memory in the controller 25 or the registration information memory 27. In accordance with the read various programs, the controller 25 controls the entire management server 5 and performs various processes. Thereby, after the controller 25 establishes a communication connection with the MFP 3 via the network communication unit 28, when registration request data D1 is sent from the MFP 3, the controller 25 receives the registration request data D1 via the network communication unit 28 and sends the registration request data D1 to the registration processor 26. The registration processor 26 previously creates a registration information database for managing registration information in the registration information memory 27. When the registration processor 26 receives the registration request data D1 from the controller 25, it extracts from the registration request data D1 the communication device unique information 20, apparatus unique information 21, user information 22, and apparatus state information 23 as registration information, and sends these information items to the registration information memory 27, thereby storing the communication device unique information 20, apparatus unique information 21, user information 22, and apparatus state information 23 in association with each other in the registration information database in the registration information memory 27. As such, the registration processor 26 stores the communication device unique information 20, apparatus unique information 21, user information 22, and apparatus state information 23 in association with each other in the registration information memory 27, thereby registering the user and MFP 3. Upon completion of the registration, the registration processor 26 notifies the controller 25 of it. In response to the notification from the registration processor 26, the controller 25 authorizes the user to use the maintenance support service and sends registration completion notification screen data to the MFP 3 via the network communication unit 28, causing the MFP 3 to display the registration completion notification screen. In this manner, the controller 25 can notify the user via the registration completion notification screen that the user has been authorized to use the maintenance support service. The maintenance support system 1 may include multiple image forming apparatuses (e.g., MFPs), and the registration information memory 27 may store communication device unique information 20, apparatus unique information 21, user information 22, and apparatus state information 23 for each image forming apparatus.

Figure 4:
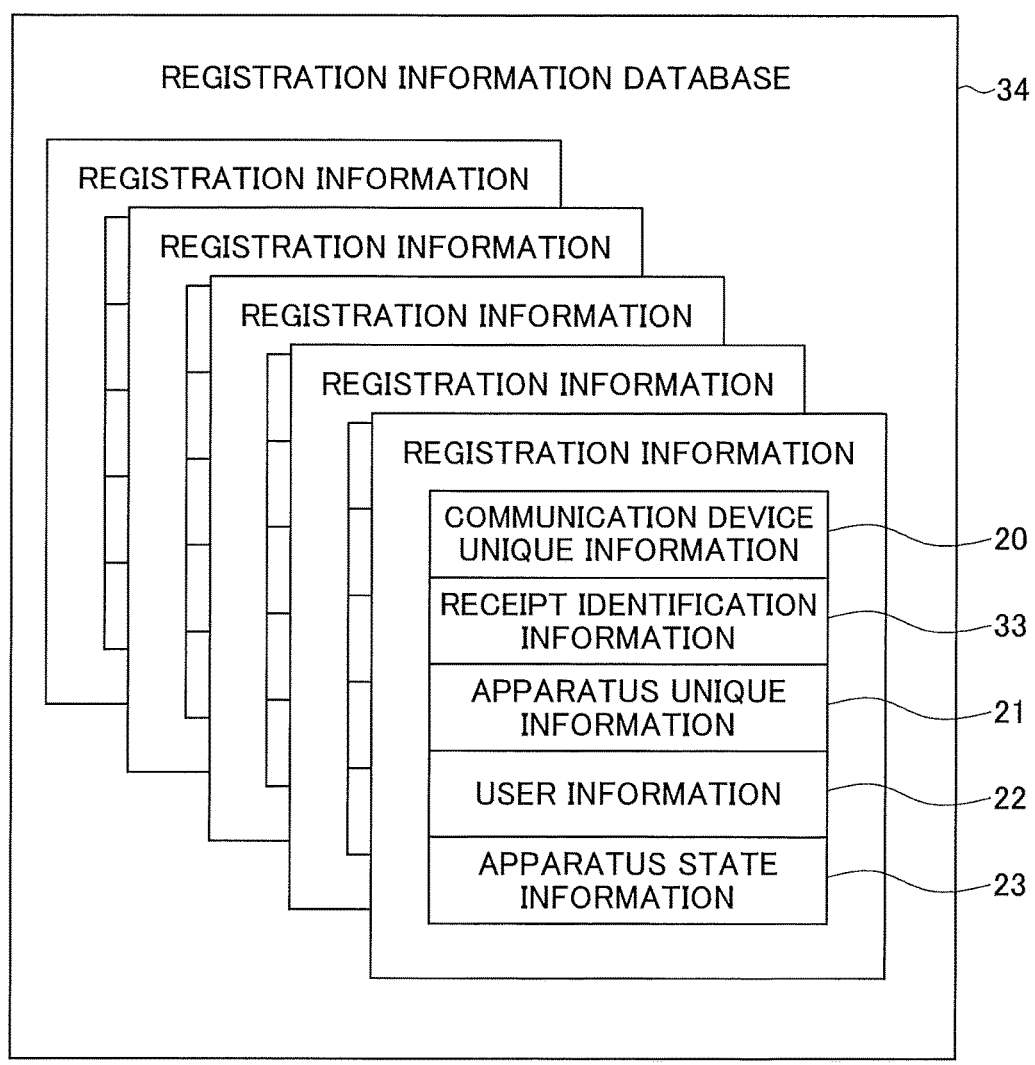
FIG. 4 is a diagram for explaining storing receipt identification information in association with communication device unique information in a registration information database.

Further, after the controller 25 establishes a communication connection with the MFP 3 via the network communication unit 28, when service request data D2 is sent from the MFP 3, the controller 25 receives the service request data D2 via the network communication unit 28 and sends the service request data D2 to the registration processor 26. When the registration processor 26 receives the service request data D2 from the controller 25, it extracts from the service request data D2 the communication device unique information 20, apparatus unique information 21, apparatus state information 23. The registration processor 26 searches the registration information memory 27 for communication device unique information 20 and apparatus unique information 21 that are stored in association with each other and identical to the extracted communication device unique information 20 and apparatus unique information 21, and thereby determines whether the user requesting the maintenance support service is a registered user already registered together with the MFP 3. Specifically, if the registration information memory 27 already stores communication device unique information 20 and apparatus unique information 21 identical to the communication device unique information 20 and apparatus unique information 21 extracted from the service request data D2 in association with each other, the registration processor 26 determines that the user is a registered user; otherwise, it determines that the user is not a registered user. If the registration processor 26 determines that the user is a registered user, the registration processor 26 notifies the controller 25 of it. In response to the notification from the registration processor 26, the controller 25 receives or accepts the request for the maintenance support service from the user, and instructs the identification information issuer 29 to issue receipt identification information. In response to the instruction from the controller 25, the identification information issuer 29 issues receipt identification information consisting of a four-character string by using one kind of character set, such as a numeric character set, a Roman character set, or a symbolic character set, or by using plural kinds of character sets in combination, and sends the receipt identification information to both the controller 25 and registration processor 26. When the controller 25 receives the receipt identification information from the identification information issuer 29, it generates receipt identification information notification data and sends it to the MFP 3 via the network communication unit 28. Thereby, the controller 25 can notify the user via the MFP 3 of the receipt identification information, which is necessary to use the maintenance support service. When the registration processor 26 receives the receipt identification information from the identification information issuer 29, it sends the receipt identification information to the registration information memory 27 and stores the receipt identification information 33 in the registration information database 34 in the registration information memory 27 in association with the communication device unique information 20 found by the search, as illustrated in FIG. 4.

Each time the user requests the maintenance support service, the identification information issuer 29 issues receipt identification information. When the registration processor 26 stores receipt identification information in the registration information memory 27, if receipt identification information that was issued in the past is stored in association with the communication device unique information 20, the registration processor 26 stores the newly issued receipt identification information in association with the communication device unique information 20 by overwriting the previous receipt identification information with the newly issued receipt identification information. Accordingly, each time the identification information issuer 29 issues receipt identification information for the same user, the registration processor 26 stores only the latest receipt identification information in the registration information memory 27 in association with the communication device unique information 20. In addition, the registration processor 26 sends the registration information memory 27 the apparatus state information 23 extracted from the service request data D2 and stores the apparatus state information 23 in the registration information memory 27 in association with the communication device unique information 20 and apparatus unique information 21 found by the search, by overwriting previous information with the newly extracted information or by adding the newly extracted information. If the registration processor 26 determines that the user requesting the maintenance support service is not a registered user, the registration processor 26 notifies the controller 25 of it. In response to the notification from the registration processor 26, the controller 25 generates registration instruction screen data for instructing the user to complete registration with the management server 5 and sends the registration instruction screen data to the MFP 3 via the network communication unit 28, thereby causing the MFP 3 to display a registration instruction screen. Thereby, the controller 25 can prompt, via the registration instruction screen, the user to complete registration with the management server 5 and then request the maintenance support service.

After the request for the maintenance support service from the user has been received, when the smartphone 7 of the user communicates with the support device 6 for telephone conversation, the support device 6 acquires from the smartphone 7 receipt identification information for the user and telephone number information indicating the telephone number as the communication device unique information, and sends authentication process request data for requesting authentication process of the user. The authentication process request data include the receipt identification information and telephone number information acquired from the smartphone 7. The controller 25 receives the authentication process request data from the support device 6 via the network interface 31 and sends it to the authentication processor 30. When the authentication processor 30 receives the authentication process request data from the controller 25, it extracts from the authentication process request data the receipt identification information and telephone number information. Then, the authentication processor 30 searches the registration information memory 27 for receipt identification information and telephone number information as the communication device unique information that are stored in association with each other and identical to the extracted receipt identification information and telephone number information, and thereby performing the authentication process for determining whether the user of the smartphone 7 currently communicating with the support device 6 is a legitimate user who has been authorized to use the maintenance support service and whose request for the maintenance support service has been received. That is, the authentication processor 30 performs the authentication process by comparing the receipt identification information and telephone number information extracted from the authentication process request data with the receipt identification information and telephone number information as the communication device unique information stored in the registration information memory 27 in association with each other. Specifically, if the registration information memory 27 already stores receipt identification information and telephone number information identical to the receipt identification information and telephone number information extracted from the authentication process request data in association with each other, the authentication processor 30 determines that the user of the smartphone 7 currently communicating with the support device 6 is a legitimate user; otherwise, it determines that the user is not a legitimate user (or another person or an unauthorized person impersonating a legitimate user). If the authentication processor 30 determines that the user is a legitimate user (i.e., if the authentication processor 30 successfully authenticates the user), it sends the controller 25 authentication result notification data (also referred to below as authentication data) indicating the result of the authentication process. The controller 25 sends the authentication data supplied from the authentication processor 30, to the support device 6 via the network interface 31. Thereby, the controller 25 can notify an operator operating the support device 6 that the user of the communication device (smartphone 7) currently communicating with the support device 6 is a legitimate user and allow the operator to talk with the user on the telephone and support maintenance of the MFP 3. During telephone conversation between the operator and user, in order to obtain the current state of the MFP 3, the support device 6 may send state information request data for requesting apparatus state information 23, the state information request data including the telephone number information as the communication device unique information. When the support device 6 sends state information request data, the controller 25 receives the state information request data via the network interface 31. The controller 25 extracts the telephone number information from the state information request data, and retrieves and reads, from the registration information memory 27, the apparatus state information stored in association with telephone number information identical to the extracted telephone number information. Then, the controller 25 sends the apparatus state information (specifically, apparatus state information data for displaying the apparatus state information) to the support device 6 via the network interface 31. Thereby, the controller 25 can allow the support device 6 to display the apparatus state information, and allow the operator to obtain the current state of the MFP 3 in supporting maintenance of the MFP 3. On the other hand, if the authentication processor 30 determines in the authentication process that the user of the smartphone 7 currently communicating with the support device 6 is not a legitimate user, it sends the controller 25 authentication result notification data (also referred to below as non-authentication data) indicating the result of the authentication process. The controller 25 sends the non-authentication data supplied from the authentication processor 30, to the support device 6 via the network interface 31. Thereby, the controller 25 can notify the support device 6 that the user of the communication device (smartphone 7) currently communicating with the support device 6 is not a legitimate user, and allow the support device 6 to end the communication, thereby preventing the maintenance support service from being improperly used by another person or an unauthorized person.

The support device 6 includes a controller 35, which is, for example, a microprocessor. The support device 6 also includes an operation unit (or user interface) 36, a display 37, a guidance voice generator 38, a public line communication unit (or communication interface) 39, a voice processor 40, an information acquisition unit (or information extractor) 42, an information memory 43, and a network interface 44, which are connected to the controller 35. The operation unit 36 includes a keyboard or the like. The display 37 is, for example, a liquid crystal display. The guidance voice generator 38 is for automatic voice guidance. The public line communication unit 39 is for communicating with the smartphone 7. A headset 41 having a microphone and a speaker is connected to the voice processor 40. The network interface 44 is for communicating with the management server 5. The controller 35 reads various programs, such as a basic program and an information acquisition program, previously stored in a memory in the controller 35 or the information memory 43. In accordance with the read various programs, the controller 35 controls the entire support device 6, and performs predetermined arithmetic processes and various processes corresponding to operation instructions input by an operator via the operation unit 36. Thereby, when calling data are sent from the smartphone 7 of the user, the controller 35 receives the calling data via the public line communication unit 39, and in response to this, establishes a communication connection with the smartphone 7. Subsequently, when telephone number notification data indicating the telephone number (communication device unique information) of the smartphone 7 are automatically sent from the smartphone 7 by a caller identification function (or caller number notification function), the controller 35 receives the telephone number notification data via the public line communication unit 39 and sends it to the information acquisition unit 42. When the information acquisition unit 42 receives the telephone number notification data from the controller 35, it extracts telephone number information from the telephone number notification data, stores it in the information memory 43, and notifies the controller 35 that the telephone number information is acquired. In response to the notification from the information acquisition unit 42, the controller 35 causes the guidance voice generator 38 to generate identification information request guidance voice data indicating an identification information request guidance voice for requesting the user to input and send receipt identification information, and sends the identification information request guidance voice data to the smartphone 7 via the public line communication unit 39. As a result, when receipt identification information notification data indicating receipt identification information are sent from the smartphone 7, the controller 35 receives the receipt identification information notification data via the public line communication unit 39 and sends it to the information acquisition unit 42. When the information acquisition unit 42 receives the receipt identification information notification data from the controller 35, it extracts the receipt identification information from the receipt identification information notification data. Further, the information acquisition unit 42 reads the telephone number information from the information memory 43, generates authentication process request data including the telephone number information and receipt identification information, and sends the authentication process request data to the controller 35.

When the controller 35 receives the authentication process request data sent from the information acquisition unit 42, it sends the authentication process request data to the management server 5 via the network interface 44. As a result, when the controller 35 receives via the network interface 44 authentication data from the management server 5, it displays on the display 37 a predetermined message indicating the result of the authentication process and instructs the operator to talk with the user on the telephone since the user of the smartphone 7 communicating with the support device 6 is a legitimate user. After that, when a voice of the operator is input to the headset 41, the controller 35 causes the voice processor 40 to generate voice data of the operator's voice, and sends the voice data to the smartphone 7 via the public line communication unit 39. Also, when voice data of a voice of the user are sent from the smartphone 7, the controller 35 receives the voice data via the public line communication unit 39, and outputs the voice corresponding to the voice data through the voice processor 40 and headset 41. This allows the operator to talk with the user on the telephone. When the controller 35 receives, via the operation unit 36 from the operator talking with the user, an instruction to display the apparatus state information, it reads the telephone number information as the communication device unique information from the information memory 43, generates state information request data including the telephone number information, and sends the state information request data to the management server 5 via the network interface 44. Then, when the controller 35 receives apparatus state information data from the management server 5 via the network interface 44, it sends the apparatus state information data to the display 37 and causes the display 37 to display the apparatus state information. Thereby, the controller 35 can allow the operator to obtain the current state of the MFP 3 of the user through the apparatus state information displayed on the display 37. In this manner, when the controller 35 establishes a communication connection for telephone conversation with the smartphone 7 of the user who is a legitimate user, the controller 35 can provide the maintenance support service to the user. On the other hand, as a result of sending the authentication process request data to the management server 5, if the controller 35 receives non-authentication data from the management server 5 via the network interface 44, the controller 35 causes the guidance voice generator 38 to generate service unavailable notification voice data indicating a service unavailable notification voice for notifying the user that the maintenance support service is unavailable, sends the service unavailable notification voice data to the smartphone 7 via the public line communication unit 39, and then ends communication with the smartphone 7. Thereby, the controller 35 can prevent the maintenance support service from being improperly used by another person.

The smartphone 7 includes a controller 50, which is, for example, a microprocessor. The smartphone 7 also includes an operation unit (or user interface) 51, a display 52, a public line communication unit (or communication interface) 53, and a voice processor 54, which are connected to the controller 50. The operation unit 51 includes multiple push-operable operation keys. The display 52 has a touch screen capable of displaying various screens and receiving touch operations on its surface. The public line communication unit 53 is for communicating with the support device 6. A voice input/output unit (or voice input/output interface) 55 having a microphone and a speaker is connected to the voice processor 54. The controller 50 reads various programs, such as a basic program and a communication processing program, previously stored in a memory in the controller 50. In accordance with the read various programs, the controller 50 controls the entire smartphone 7, and performs predetermined arithmetic processes and various processes corresponding to operation instructions input by the user through the operation unit 51 or display 52. Thereby, when the controller 50 receives input of the telephone number of the support device 6 (i.e., telephone number assigned to the support device 6) and then receives input of a calling instruction from the user via the operation unit 51 or display 52, the controller 50 sends calling data via the public line communication unit 53 to the support device 6 and establishes a communication connection with the support device 6. Subsequently, by the caller identification function, the controller 50 reads a previously stored telephone number of the smartphone 7 as the communication device unique information from a memory in the controller 50, generates telephone number notification data including the telephone number, and automatically sends the telephone number notification data to the support device 6 via the public line communication unit 53. Then, when the controller 50 receives identification information request guidance voice data from the support device 6 via the public line communication unit 53, the controller 50 displays a predetermined receipt identification information input screen on the display 52 and outputs the identification information request guidance voice corresponding to the identification information request guidance voice data via the voice processor 54 and voice input/output unit 55, thereby prompting the user to input and send receipt identification information. When the controller 50 receives, via the receipt identification information input screen displayed on the display 52, input of receipt identification information and a sending instruction, the controller 50 generates receipt identification information notification data indicating the receipt identification information and sends it to the support device 6 via the public line communication unit 53. As a result, if the user is authenticated as a legitimate user by the management server 5, voice data of a voice of the operator are sent from the support device 6. The controller 50 receives the voice data from the support device 6 via the public line communication unit 53 and outputs the voice corresponding to the voice data via the voice processor 54 and voice input/output unit 55. Also, when a voice of the user is input to the voice input/output unit 55, the controller 50 causes the voice processor 54 to generate voice data of the user's voice and sends it to the support device 6 via the public line communication unit 53. Thereby, the controller 50 can allow the user to talk with the operator on the telephone. In this manner, the controller 50 can allow the user to use the maintenance support service. On the other hand, as a result of sending the receipt identification information notification data to the support device 6, if the controller 50 receives service unavailable notification voice data from the support device 6 via the public line communication unit 53, the controller 50 outputs the voice corresponding to the service unavailable notification voice data via the voice processor 54 and voice input/output unit 55, thereby notifying the user that the maintenance support service is unavailable.

(1-2) Registration Procedure

Next, a registration procedure will be described with reference to FIG. 5. The MFP 3 and management server 5 in the maintenance support system 1 perform the registration procedure by communicating with each other. When the controller 10 of the MFP 3 displays a predetermined registration request screen on the display 12 in response to, for example, operation of the operation unit 11 or display 12 by a user, the controller 10 starts a registration request processing procedure RT1, which is a procedure on the MFP 3 side of the registration procedure and is illustrated on the left side of FIG. 5, in accordance with the registration request processing program. Upon starting the registration request processing procedure RT1, in step SP1, the controller 10 of the MFP 3 waits until receiving, from a user via the operation unit 11 or display 12, a request for registration with the management server 5 for use of the maintenance support service. When the controller 10 receives a request for registration, it proceeds to step SP2. In step SP2, the controller 10 of the MFP 3 reads from the information memory 13 the communication device unique information, apparatus unique information, user information, and apparatus state information (i.e., apparatus setting information and operation history information), generates registration request data D1 including these information items as registration information, and then proceeds to step SP3. In step SP3, the controller 10 of the MFP 3 establishes a communication connection with the management server 5 in accordance with the server address information, sends the registration request data D1 to the management server 5 via the network communication unit 14, and then proceeds to step SP4.

Figure 5:
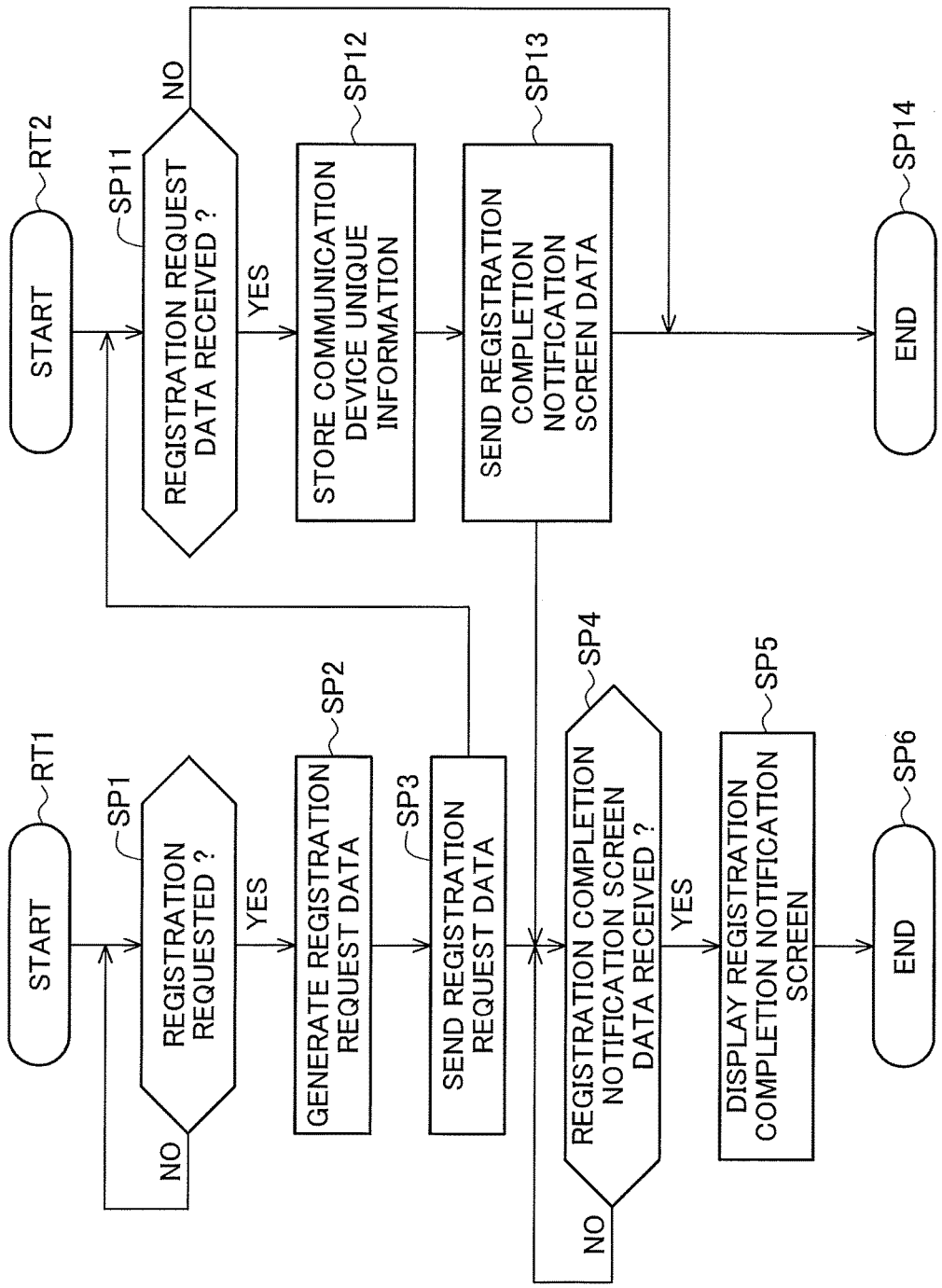
FIG. 5 is a flowchart illustrating a registration procedure.

Meanwhile, when the controller 25 of the management server 5 establishes the communication connection with the MFP 3, it starts a registration processing procedure RT2, which is a procedure on the management server 5 side of the registration procedure and is illustrated on the right side of FIG. 5, in accordance with the registration processing program. Upon starting the registration processing procedure RT2, in step SP11, the controller 25 of the management server 5 determines whether it has received registration request data D1 from the MFP 3. If the controller 25 of the management server 5 receives registration request data D1 from the MFP 3 via the network communication unit 28 and makes a positive determination in step SP11, it proceeds to step SP12. In step SP12, the controller 25 of the management server 5 causes the registration processor 26 to extract from the registration request data D1 the communication device unique information, apparatus unique information, user information, and apparatus state information as the registration information and store these information items in association with each other in the registration information database 34 in the registration information memory 27, thereby registering the user and MFP 3 and authorizing use of the maintenance support service. Then, the controller 25 proceeds to step SP13. In step SP13, the controller 25 of the management server 5 sends registration completion notification screen data to the MFP 3 via the network communication unit 28 and then proceeds to step SP14 to end the registration processing procedure RT2. On the other hand, if the controller 25 of the management server 5 makes negative determination in step SP11 (e.g., if the controller 25 receives service request data D2 from the MFP 3), it proceeds to step SP14 to end the registration processing procedure RT2. In step SP4, the controller 10 of the MFP 3 waits for registration completion notification screen data sent from the management server 5, and if it receives the registration completion notification screen data via the network communication unit 14, it proceeds to step SP5. In step SP5, the controller 10 of the MFP 3 displays a registration completion notification screen on the display 12 to notify the user that the registration with the management server 5 has been completed and the use of the maintenance support service has been authorized, and then proceeds to step SP6 to end the registration request processing procedure RT1.

(1-3) Issuing Procedure

Next, an issuing procedure will be described with reference to FIG. 6. The MFP 3 and management server 5 in the maintenance support system 1 perform the issuing procedure by communicating with each other. When the controller 10 of the MFP 3 displays an error message on the display 12 due to occurrence of a trouble in the MFP 3, it starts a service request processing procedure RT3, which is a procedure on the MFP 3 side of the issuing procedure and is illustrated on the left side of FIG. 6, in accordance with the service request processing program. Upon starting the service request processing procedure RT3, in step SP21, the controller 10 of the MFP 3 determines whether it has received a request for the maintenance support service from a user. If the controller 10 of the MFP 3 receives a request for the maintenance support service through a push operation of the service request key by a user and makes a positive determination in step SP21, the controller 10 proceeds to step SP22. In step SP22, the controller 10 of the MFP 3 reads from the information memory 13 the communication device unique information, apparatus unique information, and apparatus state information (i.e., apparatus setting information and operation history information), generates service request data D2 including these information items as service request information, and then proceeds to step SP23. In step SP23, the controller 10 of the MFP 3 establishes a communication connection with the management server 5 in accordance with the server address information, sends the service request data D2 to the management server 5 via the network communication unit 14, and then proceeds to step SP24.

Figure 6:
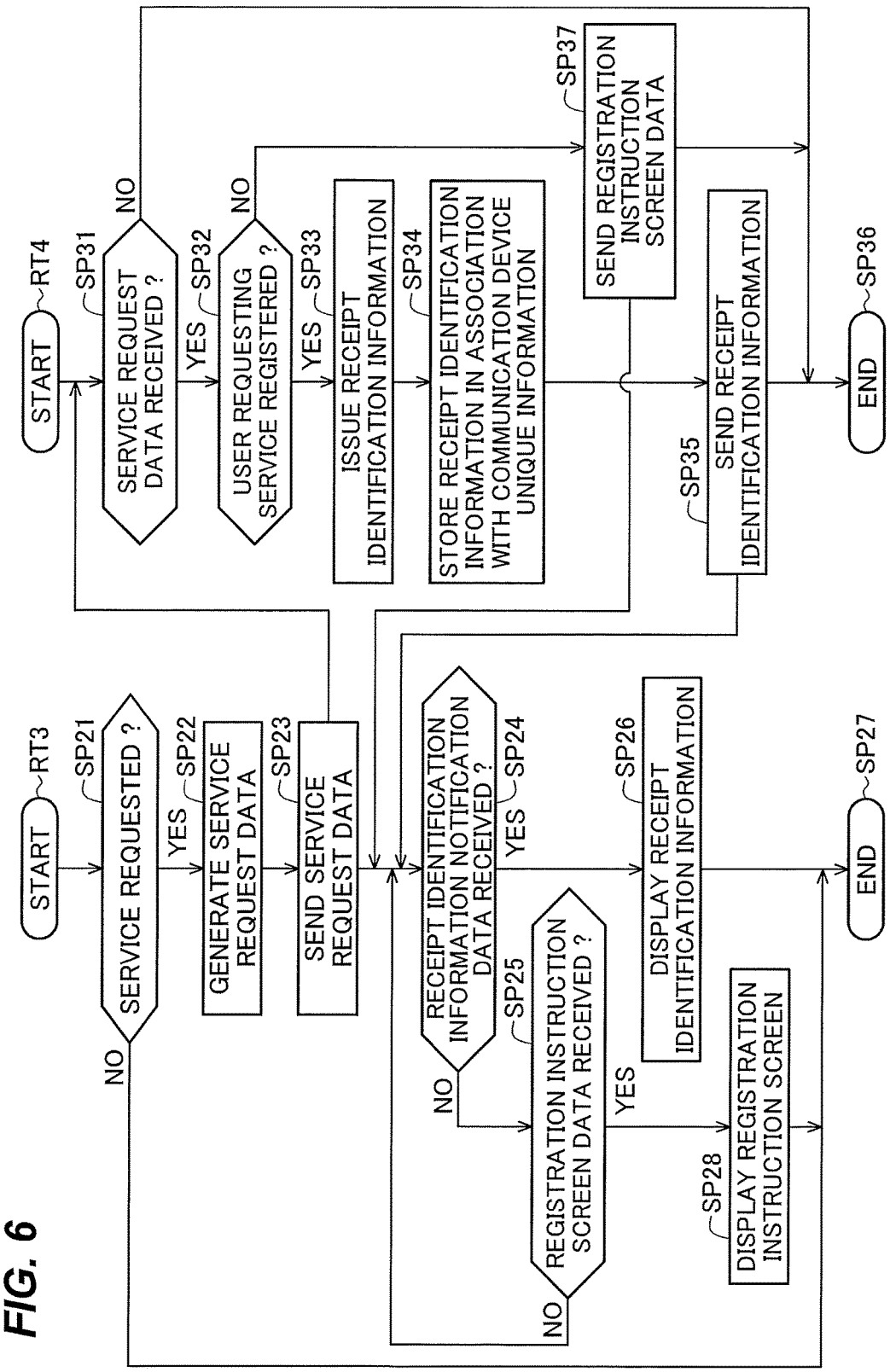
FIG. 6 is a flowchart illustrating an issuing procedure.

Meanwhile, when the controller 25 of the management server 5 establishes the communication connection with the MFP 3, it starts an information issuing procedure RT4, which is a procedure on the management server 5 side of the issuing procedure and is illustrated on the right side of FIG. 6, in accordance with the information issuing program. Upon starting the information issuing procedure RT4, in step SP31, the controller 25 of the management server 5 determines whether it has received service request data D2 from the MFP 3. If the controller 25 of the management server 5 receives service request data D2 from the MFP 3 via the network communication unit 28 and makes a positive determination in step SP31, it proceeds to step SP32. In step SP32, the controller 25 of the management server 5 causes the registration processor 26 to extract from the service request data D2 the communication device unique information, apparatus unique information, and apparatus state information, and search the registration information memory 27 for communication device unique information and apparatus unique information that are stored in association with each other and identical to the extracted communication device unique information and apparatus unique information, thereby determining whether the user requesting the maintenance support service is a registered user who has already registered together with the MFP 3. If the registration information memory 27 already stores communication device unique information and apparatus unique information identical to the communication device unique information and apparatus unique information extracted from the service request data D2 in association with each other and the controller 25 of the management server 5 makes in step SP32 a positive determination that the user is a registered user, the controller 25 proceeds to step SP33. In step SP33, the controller 25 of the management server 5 receives or accepts the request for the maintenance support service from the user and causes the identification information issuer 29 to issue receipt identification information, then proceeding to step SP34. In step SP34, the controller 25 of the management server 5 causes the registration processor 26 to store the receipt identification information in association with the communication device unique information of the user in the registration information database 34 in the registration information memory 27, then proceeding to step SP35. In step SP35, the controller 25 of the management server 5 generates receipt identification information notification data including the receipt identification information and sends it to the MFP 3 via the network communication unit 28, then proceeding to step SP36 to end the information issuing procedure RT4. On the other hand, if the user requesting for the maintenance support service has not yet been registered and the controller 25 of the management server 5 makes a negative determination in step SP32, the controller 25 proceeds to step SP37. In step SP37, the controller 25 of the management server 5 generates registration instruction screen data and sends it to the MFP 3 via the network communication unit 28, then proceeding to step SP36 to end the information issuing procedure RT4. In step SP31, if the controller 25 of the management server 5 makes a negative determination (e.g., if the controller 25 receives registration request data D1 from the MFP 3), it proceeds to step SP36 to end the information issuing procedure RT4.

In step SP24, the controller 10 of the MFP 3 determines whether it has received receipt identification information notification data from the management server 5. If the controller 10 makes a negative determination in step SP24, it proceeds to step SP25. In step SP25, the controller 10 of the MFP 3 determines whether it has received registration instruction screen data from the management server 5. If the controller 10 makes a negative determination in step SP25, it returns to step SP24. Thus, the controller 10 of the MFP 3 repeatedly performs the processes of steps SP24 and SP25 until it makes a positive determination in step SP24 or SP25, and waits for receipt identification information notification data or registration instruction screen data from the management server 5. If the controller 10 of the MFP 3 receives receipt identification information notification data from the management server 5 via the network communication unit 14 and makes a positive determination in step SP24, it proceeds to step SP26. In step SP26, the controller 10 of the MFP 3 displays the receipt identification information on the display 12 to notify the user of the receipt identification information issued this time by the management server 5 after receipt of the request for the maintenance support service, then proceeding to step SP27 to end the service request processing procedure RT3. On the other hand, if the controller 10 of the MFP 3 receives registration instruction screen data from the management server 5 via the network communication unit 14 and makes a positive determination in step SP25, it proceeds to step SP28. In step SP28, the controller 10 of the MFP 3 displays a registration instruction screen on the display 12 to prompt the user to complete registration with the management server 5 and then request the maintenance support service, then proceeding to step SP27 to end the service request processing procedure RT3. In step SP21, if the controller 10 of the MFP 3 makes a negative determination (e.g., if the user does not push the service request key and use the maintenance support service), it proceeds to step SP27 to end the service request processing procedure RT3.

(1-4) Authentication Procedure

Next, an authentication procedure will be described with reference to FIGS. 7 and 8. The smartphone 7, support device 6, and management server 5 in the maintenance support system 1 perform the authentication procedure by communicating with each other. When the controller 50 of the smartphone 7 sends calling data to the support device 6 via the public line communication unit 53 in response to, for example, operation of the operation unit 51 or display 52 by a user, and establishes a communication connection with the support device 6, the controller 50 starts a communication processing procedure RT5, which is a procedure on the smartphone 7 side of the authentication procedure and is illustrated on the left sides of FIGS. 7 and 8, in accordance with the communication processing program. Upon starting the communication processing procedure RT5, in step SP41, the controller 50 of the smartphone 7 reads a telephone number of the smartphone 7 as communication device unique information from a memory in the controller 50, generates telephone number notification data including the telephone number, and sends the telephone number notification data to the support device 6 via the public line communication unit 53, then proceeding to step SP42. Meanwhile, when the controller 35 of the support device 6 establishes the communication connection with the smartphone 7, it starts an information acquisition procedure RT6, which is a procedure on the support device 6 side of the authentication procedure and is illustrated in the middle parts of FIGS. 7 and 8, in accordance with the information acquisition program. Upon starting the information acquisition procedure RT6, in step SP51, the controller 35 of the support device 6 waits for telephone number notification data from the smartphone 7, and if the controller 35 receives the telephone number notification data via the public line communication unit 53, it proceeds to step SP52. In step SP52, the controller 35 of the support device 6 causes the information acquisition unit 42 to extract the telephone number information from the telephone number notification data and store it in the information memory 43, then proceeding to step SP53. In step SP53, the controller 35 of the support device 6 causes the guidance voice generator 38 to generate identification information request guidance voice data, and sends the identification information request guidance voice data to the smartphone 7 via the public line communication unit 39, then proceeding to step SP54.

Meanwhile, in step SP42, the controller 50 of the smartphone 7 waits for identification information request guidance voice data from the support device 6, and if the controller 50 receives the identification information request guidance voice data via the public line communication unit 53, it proceeds to step SP43. In step SP43, while the controller 50 of the smartphone 7 displays receipt identification information input screen on the display 52, it outputs an identification information request guidance voice via the voice input/output unit 55 to prompt the user to input and send receipt identification information, then proceeding to step SP44. In step SP44, the controller 50 of the smartphone 7 waits for the user to input receipt identification information and a sending instruction on the receipt identification information input screen, and if it receives input of receipt identification information and a sending instruction, it proceeds to step SP45. In step SP45, the controller 50 of the smartphone 7 generates receipt identification information notification data indicating the receipt identification information and sends the receipt identification information notification data to the support device 6 via the public line communication unit 53, then proceeding to step SP46. Meanwhile, in step SP54, the controller 35 of the support device 6 waits for receipt identification information notification data from the smartphone 7, and if it receives the receipt identification information notification data via the public line communication unit 39, it proceeds to step SP55. In step SP55, the controller 35 of the support device 6 causes the information acquisition unit 42 to extract the receipt identification information from the receipt identification information notification data, reads the telephone number information from the information memory 43, and generates authentication process request data including the telephone number information and receipt identification information, then proceeding to step SP56. In step SP56, the controller 35 of the support device 6 sends the authentication process request data to the management server 5 via the network interface 44, then proceeding to step SP57.

Figure 7:
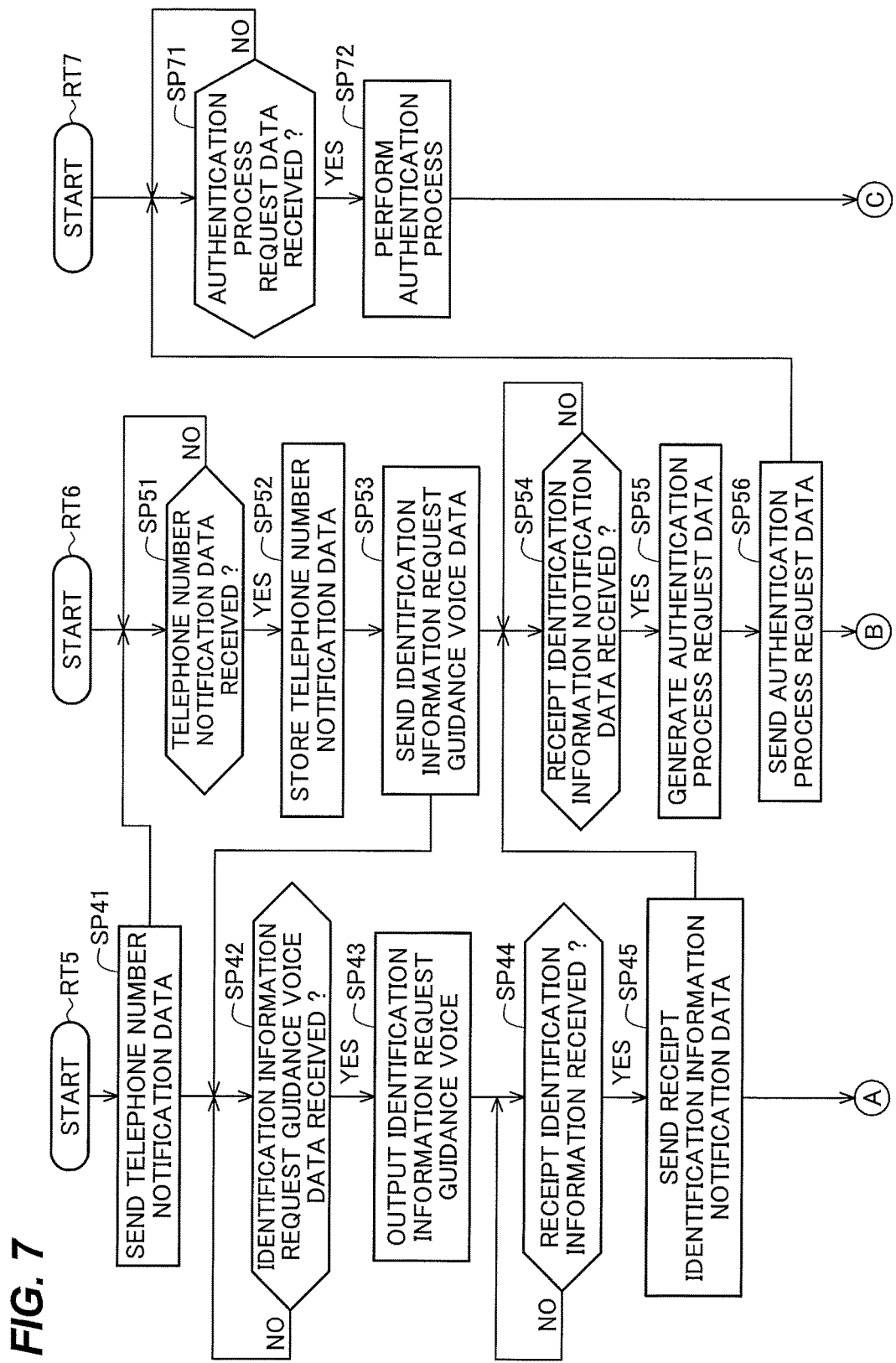
FIGS. 7 and 8 are flowcharts illustrating an authentication procedure.
Figure 8:
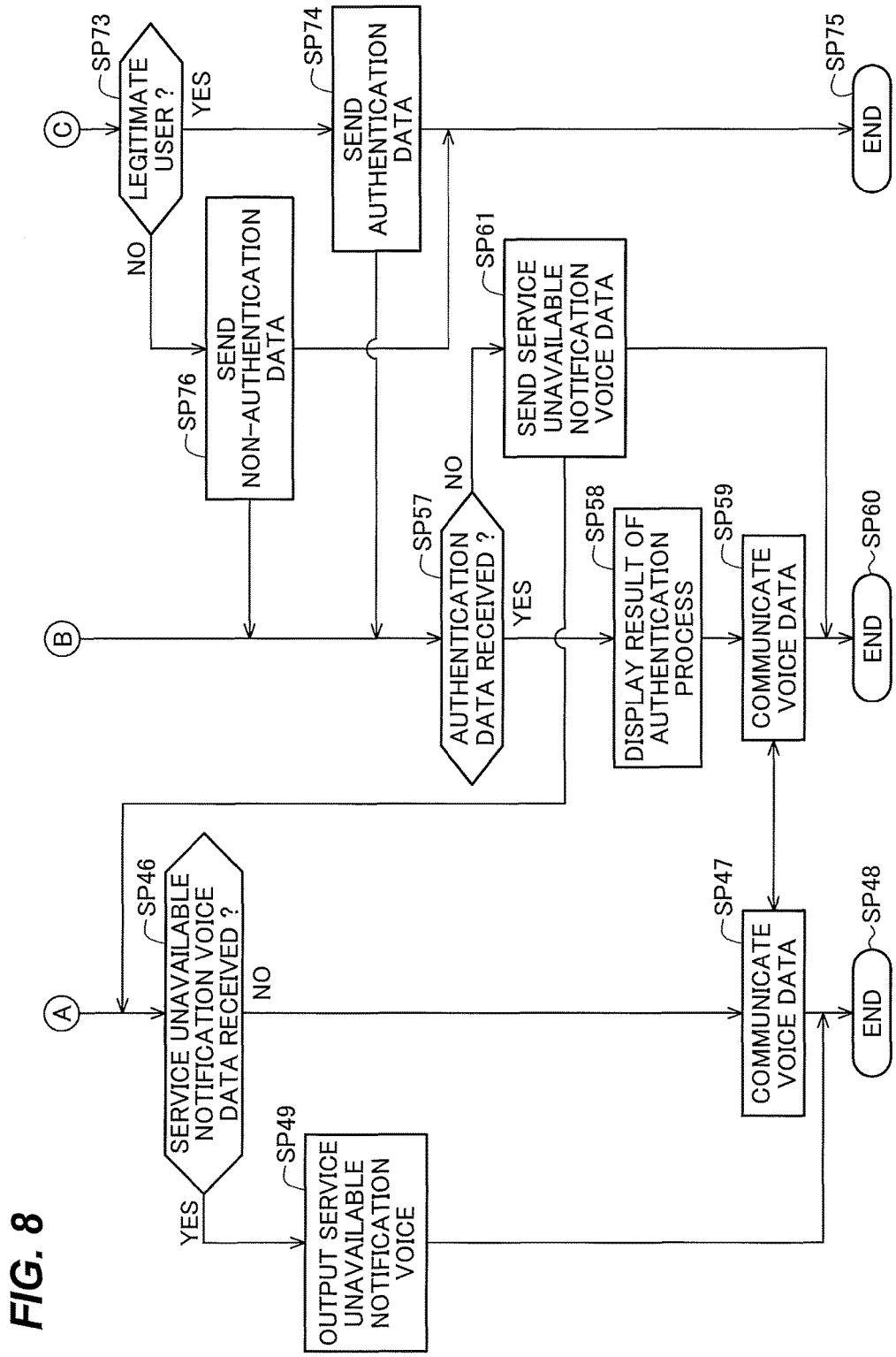

Meanwhile, the controller 25 of the management server 5 starts a user authentication procedure RT7, which is a procedure on the management server 5 side of the authentication procedure and is illustrated on the right sides of FIGS. 7 and 8, in accordance with the user authentication program. Upon starting the user authentication procedure RT7, in step SP71, the controller 25 of the management server 5 waits for authentication process request data from the support device 6, and if it receives the authentication process request data via the network interface 31, it proceeds to step SP72. In step SP72, the controller 25 of the management server 5 causes the authentication processor 30 to extract the receipt identification information and telephone number information from the authentication process request data and perform an authentication process by searching the registration information memory 27 for receipt identification information and telephone number information that are stored in association with each other and identical to the extracted receipt identification information and telephone number information, then proceeding to step SP73. In step SP73, the controller 25 of the management server 5 causes the authentication processor 30 to determine whether the user is a legitimate user. In step SP73, if the registration information memory 27 already stores receipt identification information and telephone number information identical to the receipt identification information and telephone number information acquired by the support device 6 from the user (or extracted from the authentication process request data) in association with each other and the authentication processor 30 makes a positive determination that the user of the smartphone 7 currently communicating with the support device 6 is a legitimate user, the controller 25 of the management server 5 proceeds to step SP74. In step SP74, the controller 25 of the management server 5 sends authentication data indicating the authentication result to the support device 6 via the network interface 31, then proceeding to step SP75 to end the user authentication procedure RT7. On the other hand, in step SP74, if the registration information memory 27 does not store receipt identification information and telephone number information identical to the receipt identification information and telephone number information acquired by the support device 6 from the user in association with each other and the authentication processor 30 makes a negative determination that the user of the smartphone 7 currently communicating with the support device 6 is not a legitimate user, the controller 25 of the management server 5 proceeds to step SP76. In step SP76, the controller 25 of the management server 5 sends, via the network interface 31 to the support device 6, non-authentication data indicating that the user is not a legitimate user, then proceeding to step SP75 to end the user authentication procedure RT7.

Meanwhile, in step SP57, the controller 35 of the support device 6 waits for authentication data or non-authentication data from the management server 5, and if it receives authentication data via the network interface 44, it proceeds to step SP58. In step SP58, the controller 35 of the support device 6 displays the result of the authentication process on the display 37 and instructs the operator to talk with the user on the telephone since the user of the smartphone 7 communicating with the support device 6 is a legitimate user, then proceeding to step SP59. In step SP59, until terminating the communication with the smartphone 7 in response to a communication termination instruction input to the support device 6 or smartphone 7 by the operator (or a maintenance worker) or the user, the controller 35 of the support device 6 sends voice data of voice of the operator to the smartphone 7 and receives voice data of voice of the user from the smartphone 7, thereby allowing the operator and user to talk with each other. As necessary, the controller 35 connects the smartphone 7 of the user to a communication device (e.g., smartphone) of a maintenance worker, and sends voice data of the maintenance worker from the communication device of the maintenance worker to the smartphone 7 and sends voice data of the user from the smartphone 7 to the communication device of the maintenance worker, thereby allowing the maintenance worker and user to talk with each other on the telephone. Thereby, the controller 35 allows the operator and maintenance worker to support the maintenance of the MFP 3. Then, in step SP59, if a communication termination instruction is input to the support device 6 or smartphone 7 by the operator (or maintenance worker) or user, the controller 35 of the support device 6 terminates the communication with the smartphone 7, then proceeding to step SP60 to end the information acquisition procedure RT6. On the other hand, in step SP57, if the controller 35 of the support device 6 receives non-authentication data from the management server 5 via the network interface 44, it proceeds to step SP61. In step SP61, the controller 35 of the support device 6 causes the guidance voice generator 38 to generate service unavailable notification voice data and sends it to the smartphone 7 via the public line communication unit 39 and terminates the communication with the smartphone 7, then proceeding to step SP60 to end the information acquisition procedure RT6.

Meanwhile, in step SP46, the controller 50 of the smartphone 7 determines whether it has received service unavailable notification voice data from the support device 6, and if it makes a negative determination that it has received no service unavailable notification voice data, it proceeds to step SP47. In step SP47, until terminating the communication with the support device 6 in response to a communication termination instruction input to the smartphone 7 or support device 6 by the operator (or the maintenance worker) or the user, the controller 50 of the smartphone 7 sends voice data of voice of the user to the support device 6 and receives voice data of voice of the operator from the support device 6, thereby allowing the user and operator to talk with each other. As necessary, the controller 50 sends voice data of voice of the user to the support device 6 and receives voice data of voice of the maintenance worker from the support device 6, thereby allowing the user and maintenance worker to talk with each other. Thereby, the controller 50 allows the user to receive support of maintenance of the MFP 3. Then, in step SP47, if a communication termination instruction is input to the smartphone 7 or support device 6 by the user or operator (or maintenance worker), the controller 50 of the smartphone 7 terminates the communication with the support device 6, then proceeding to step SP48 to end the communication processing procedure RT5. On the other hand, in step SP46, if the controller 50 of the smartphone 7 receives service unavailable notification voice data from the support device 6 via the public line communication unit 53 and makes a positive determination, it proceeds to step SP49. In step SP49, the controller 50 of the smartphone 7 outputs a service unavailable notification voice via the voice input/output unit 55 and terminates the communication with the support device 6, then proceeding to step SP48 to end the communication processing procedure RT5.

In this embodiment, in order to allow the user to use the maintenance support service, when the controller 50 of the smartphone 7 communicates with the support device 6 for communicating e-mail messages, it first sends the support device 6 an e-mail message having a header in which an e-mail address as the communication device unique information is automatically included. When the controller 35 of the support device 6 receives the e-mail message from the smartphone 7, it causes the information acquisition unit 42 to extract the e-mail address from the header of the e-mail message and stores it in the information memory 43. Then, the controller 35 of the support device 6 generates a reply e-mail message including an instruction to describe receipt identification information in the subject line of an e-mail message, and sends the reply e-mail message to the smartphone 7. When the controller 50 of the smartphone 7 receives the reply e-mail message from the support device 6, it generates an e-mail message with receipt identification information described in its subject line in accordance with operation by the user, and sends the e-mail message to the support device 6. When the controller 35 of the support device 6 receives the e-mail message sent again from the smartphone 7, it causes the information acquisition unit 42 to extract the receipt identification information described in the subject line from the e-mail message, and generates authentication process request data as described above. In this embodiment, the maintenance support system 1 may be configured as follows: the controller 50 of the smartphone 7 generates an e-mail message to be sent first including a header in which an e-mail address as the communication device unique information is included and a subject line in which receipt identification information is described in accordance with operation by the user, and sends the e-mail message to the support device 6; when the controller 35 of the support device 6 receives the e-mail message from the smartphone 7, it causes the information acquisition unit 42 to extract the e-mail address and receipt identification information from the e-mail message, and generates authentication process request data.

Further, in order to allow the user to use the maintenance support service, when a personal computer used by the user as a communication device communicates with the web page publication device for access to the web page, it may automatically send an IP address and a MAC address as the communication device unique information to the network address of the web page, thereby allowing the web page publication device to obtain the IP address and MAC address, and display the web page. Then, the personal computer may receive input of receipt identification information on the web page in accordance with operation by the user and send the receipt identification information to the web page publication device, thereby allowing the web page publication device to obtain the receipt identification information and generate authentication process request data.

(1-5) Operation and Advantages of Embodiment

The maintenance support system 1 according to the embodiment includes the image forming apparatus (MFP 3), management device (management server 5), and information processing terminal (smartphone 7) and provides a service for supporting maintenance of the image forming apparatus. The image forming apparatus generates service request data including terminal identification information for identifying the information processing terminal stored in a first memory (the information memory 13) and sends it to the management device. When the management device receives the service request data sent from the image forming apparatus, the management device issues receipt identification information, sends the receipt identification information to the image forming apparatus or information processing terminal, and stores in the registration information memory 27 the terminal identification information included in the service request data and the receipt identification information in association with each other. When the information processing terminal receives input of receipt identification information in accordance with operation by a user, the information processing terminal sends the received receipt identification information and the terminal identification information stored in the memory in the controller 50, to the outside of the information processing terminal (specifically, to the information acquisition device or management device). When the management device receives the terminal identification information and receipt identification information sent from the information processing terminal, the management device compares the received terminal identification information and receipt identification information with the terminal identification information and receipt identification information stored in the registration information memory 27 in association with each other, and outputs a result of the comparison. In this configuration, when the service is used, the terminal identification information is automatically sent by the information processing terminal of the user. This can prevent the terminal identification information from being used for communication by another person other than the user. Thus, although the receipt identification information may be improperly obtained by another person, the number of characters of the receipt identification information can be made as small as possible. This can allow the user to easily memorize and enter the receipt identification information. Thus, if the receipt identification information is improperly obtained by another person, improper use of the service by the other person can be almost surely prevented. In addition, it is possible to make the number of characters of the receipt identification information, which is to be input by the user, as small as possible, thereby simplifying input operation by the user. As a result, it is possible to provide a maintenance support system, a service providing method, a management device, an image forming apparatus, and an information processing terminal capable of allowing a user to easily use the service while preventing the service from being improperly used by another person.

More specifically, in the above configuration, when the MFP 3 receives a request for registration for use of the maintenance support service from a user, it sends the management server 5 registration request data D1 including a telephone number information as the communication device unique information used in communication for telephone conversation by the smartphone 7 used by the user for using the maintenance support service. The management server 5 receives the registration request data D1 from the MFP 3 and stores the registration information including the telephone number information in the registration information memory 27, thereby registering the user and MFP 3 and authorizing the user to use the maintenance support service. After that, when a trouble occurs in the MFP 3, if the MFP 3 receives a request for the maintenance support service from a user, the MFP 3 sends the management server 5 service request data D2 including the telephone number information as the communication device unique information. When the management server 5 receives the service request data D2 from the MFP 3, it determines whether the user requesting for the maintenance support service is a registered user, based on the telephone number information included in the service request data D2 and the telephone number information stored in the registration information memory 27. If the management server 5 determines that the user is a registered user, it receives or accepts the request for the maintenance support service from the user, issues receipt identification information consisting of four characters, stores the receipt identification information in the registration information memory 27 in association with the telephone number information, and sends the receipt identification information to the MFP 3 to notify the user of it. When the user uses the maintenance support service, the smartphone 7 automatically sends the telephone number information of the smartphone 7 to the support device 6 and sends the support device 6 receipt identification information input by the user. When the support device 6 receives the telephone number information and receipt identification information from the smartphone 7, it sends authentication process request data including these information items to the management server 5. When the management server 5 receives the authentication process request data from the support device 6, it performs an authentication process to determine whether the user intending to use the maintenance support service is a legitimate user, based on the telephone number information and receipt identification information included in the authentication process request data and the telephone number information and receipt identification information stored in the registration information memory 27 in association with each other. Then, the management server 5 sends authentication data or non-authentication data to the support device 6 to notify the support device 6 of the result of the authentication process.

With the above configuration, the maintenance support system 1 uses the receipt identification information and the telephone number information as the communication device unique information of the smartphone 7 of the user, for the authentication process when the maintenance support service is used; the telephone number information is automatically sent by the smartphone 7 of the user to the support device 6, not input by the user. This prevents the telephone number information from being used by another person in communication with the support device 6. Thus, although the receipt identification information may be improperly obtained by another person, the maintenance support system 1 can make the number of characters of the receipt identification information as small as possible (e.g., four), thereby allowing the user to easily memorize and input the receipt identification information. Even if the receipt identification information is improperly obtained by another person, the maintenance support system 1 can almost surely prevent the maintenance support service from being improperly used by the other person. The maintenance support system 1 can make the number of characters of the receipt identification information, which is input by the user for the authentication process, as small as possible, thereby simplifying input operation for the authentication process. Thus, the maintenance support system 1 can prevent another person from improperly using the maintenance support service and allow the user to easily use the maintenance support service. Also when the maintenance support system 1 uses the e-mail address, or IP address and MAC address as the communication device unique information of the smartphone 7 or personal computer of the user together with the receipt identification information, it can prevent another person from improperly using the maintenance support service and allow the user to easily use the maintenance support service, as in the case of the telephone number information.

In the maintenance support system 1, when the management server 5 issues receipt identification information, it stores the receipt identification information in the registration information memory 27 in association with the communication device unique information, and then sends the MFP 3 receipt identification information notification data indicating the receipt identification information to notify the user of it. If the management server 5 were configured to notify the user of the receipt identification information and then store the receipt identification information in the registration information memory 27, the following problem would occur: if the management server 5 is stopped due to power failure or other reasons after notifying the user of the receipt identification information and before storing the receipt identification information in the registration information memory 27, the authentication process cannot be properly performed. This can be prevented by the above configuration of the embodiment. Further, in the maintenance support system 1, when the MFP 3 receives a request for the maintenance support service from the user, it reads the apparatus setting information and operation history information as the apparatus state information from the information memory 13, generates service request data D2 including the communication device unique information (e.g., telephone number information) and the apparatus state information 23, and sends it to the management server 5; upon receiving the service request data D2, the management server 5 issues receipt identification information, and stores the apparatus state information included in the service request data D2 in the registration information memory 27 in association with the communication device unique information (e.g., telephone number information). Thus, in the maintenance support system 1, for example, when the support device 6 communicates with the smartphone 7, if the management server 5 authenticates the user as a legitimate user, the support device 6 can retrieve and read the apparatus state information of the MFP 3 used by the user from the management server 5 based on the communication device unique information (e.g., telephone number information) acquired from the smartphone 7, thereby allowing the operator to easily obtain the state of the MFP 3.

In the embodiment, the authentication device (management server 5) includes: a reception unit (or receiver) (e.g., the network communication unit 28) configured to receive device information (e.g., terminal identification information) of the communication device and receipt information (e.g., receipt identification information) sent from the communication device; and an authentication unit (e.g., the authentication processor 30) configured to authenticate the communication device based on the received device information and receipt information. This configuration can provide secure authentication. In this configuration, the receipt information may be issued by the authentication device in response to a request. The authentication device may be configured to store the issued receipt information and the device information in association with each other. The device information may be a telephone number, an e-mail address, an IP address, or a MAC address.

(2) Modifications (2-1) First Modification

In the above embodiment, the management server 5 determines that the user of the smartphone 7 is not a legitimate user and sends non-authentication data to the support device 6 if the registration information memory 27 does not store receipt identification information and telephone number information identical to the receipt identification information and telephone number information extracted from the authentication process request data in association with each other. However, the present invention is not limited to this. The management server 5 may be configured as follows: if the registration information memory 27 stores receipt identification information identical to the receipt identification information extracted from the authentication process request data but stores telephone number information different from the telephone number information extracted from the authentication process request data in association with the receipt identification information, the management server 5 determines that the user of the smartphone 7 is not a legitimate user and sends non-authentication data to the support device 6; if the registration information memory 27 stores telephone number information identical to the telephone number information extracted from the authentication process request data but stores receipt identification information different from the receipt identification information extracted from the authentication process request data in association with the telephone number information, the management server 5 causes the support device 6 to notify the user of the smartphone 7 that the user is allowed to reenter receipt identification information up to a predetermined upper limit number of times, and allows the user to reenter receipt identification information up to the predetermined upper limit number of times. This is because the user may enter the receipt identification information by mistake. With this configuration, when the user enters receipt identification information in the smartphone 7 by mistake, it is possible to allow the user to reenter receipt identification information, without restarting communication with the support device 6 from the beginning, while maintaining the communication connection between the support device 6 and smartphone 7. This improves user-friendliness. In this configuration, if the number of times the user has reentered receipt identification information reaches the predetermined upper limit number of times and the management server 5 has not received receipt identification information identical to the receipt identification information stored in the registration information memory 27 in association with the telephone number information (i.e., the management server 5 has not extracted, from authentication process request data, receipt identification information identical to the receipt identification information stored in the registration information memory 27 in association with the telephone number information), the management server 5 may prompt, via the support device 6, the user of the smartphone 7 to acquire again receipt identification information from the management server 5 and communicate with the support device 6 again. This is because the user may incorrectly remember the receipt identification information. With this configuration, when the user incorrectly remembers the receipt identification information, it is possible to allow the user to obtain new receipt identification information. This can prevent a situation in which the user incorrectly remember the receipt identification information, and no matter how many times the user uses the smartphone 7 to communicate with the support device 6, the user cannot use the maintenance support service, thereby improving user-friendliness. Also, in a case where the authentication process is performed only once when the smartphone 7 communicates with the support device 6 as in the embodiment, if the user incorrectly remembers the receipt identification information, the user enters receipt identification information different from the receipt identification information stored in the registration information memory 27, and thus the management server 5 terminates communication between the smartphone 7 and the support device 6. Then, if the user causes the smartphone 7 to communicate with the support device 6 again, as long as the user incorrectly remembers the receipt identification information, the communication between the smartphone 7 and the support device 6 is terminated. Thus, in a configuration in which the authentication process is performed only once when the smartphone 7 communicates with the support device 6 as in the embodiment, if receipt identification information entered by the user does not match the receipt identification information stored in the registration information memory 27, the management server 5 may cause or allow the user to reacquire receipt identification information from the management server 5 and communicate with the support device 6 again. This can prevent a situation in which no matter how many times the user uses the smartphone 7 to communicate with the support device 6, the user cannot use the maintenance support service, thereby improving user-friendliness.

(2-2) Second Modification

In the above embodiment, the MFP 3 notifies the user of receipt identification information issued by the management server 5 by displaying it, but the present invention is not limited to this. The MFP 3 may notify the user of receipt identification information issued by the management server 5 by printing it on a medium (i.e., forming a printed image indicating the receipt identification information on a surface of a medium). In this case, the MFP 3 may print the receipt identification information on the medium under remote control by the management server 5 or in accordance with operation of the MFP 3 by the user.

(2-3) Third Modification

In the above embodiment, when the personal computer as the communication device used by the user communicates with the web page publication device for access to the web page, the IP address and MAC address are acquired for the authentication process as the communication device unique information. However, the present invention is not limited to this. The personal computer may be installed with a dedicated web browser that causes the personal computer to include an e-mail address as the communication device unique information in a From field in a Hypertext Transfer Protocol (HTTP) header of an HTTP request and send the HTTP request to the network address of the web page, thereby allowing the web page publication device to acquire the e-mail address as the communication device unique information for the authentication process.

(2-4) Fourth Modification

In the above embodiment, each time the management server 5 receives a request for the maintenance support service from the user, the management server 5 issues receipt identification information, but the present invention is not limited to this. The management server 5 may issue receipt identification information in response to a first request for the maintenance support service from the user and then allow the user to use the same receipt identification information every time the user uses the maintenance support service. In another aspect, after the management server 5 issues receipt identification information in response to a request for the maintenance support service from the user, until a validity period set for the receipt identification information expires, the management server 5 allows the user to use the same receipt identification information every time the user uses the maintenance support service; after the validity period expires, upon receiving a request for the maintenance support service from the user, the management sever 5 issues new receipt identification information. Further, in the above embodiment, the management server 5 issues receipt identification information that is a string consisting of four characters, in response to a request for the maintenance support service from the user, but the management server 5 may issue receipt identification information that is a string consisting of three characters or five or more characters. However, as described above, even if the number of characters of receipt identification information is relatively small, by using communication device unique information together with receipt identification information for the authentication process, the maintenance support service can be prevented from being improperly used by another person. Thus, without making the number of characters of receipt identification information too great, from the viewpoint of ease of memorization or input, the management server 5 may issue receipt identification information that is a string consisting of about eight characters.

(2-5) Fifth Modification

In the above embodiment, the controller 10 of the MFP 3 performs the registration request processing procedure RT1 and service request processing procedure RT3 illustrated in FIGS. 5 and 6 in accordance with the registration request processing program and service request processing program previously stored in the memory in the controller 10 or the information memory 13. However, the present invention is not limited to this. The controller 10 of the MFP 3 may install a registration request processing program and a service request processing program read from a computer-readable storage medium storing them or obtained from the outside via a wired or wireless communication medium, such as a local area network, the Internet, or digital satellite broadcasting, and then perform the registration request processing procedure RT1 and service request processing procedure RT3. Further, in the above embodiment, the controller 25 of the management server 5 performs the registration processing procedure RT2, information issuing procedure RT4, and user authentication procedure RT7 illustrated in FIGS. 5 to 8 in accordance with the registration processing program, information issuing program, and user authentication program previously stored in the memory in the controller 25 or the registration information memory 27. However, the present invention is not limited to this. The controller 25 of the management server 5 may install a registration processing program, an information issuing program, and a user authentication program read from a computer-readable storage medium storing them or obtained from the outside via a wired or wireless communication medium, such as a local area network, the Internet, or digital satellite broadcasting, and then perform the registration processing procedure RT2, information issuing procedure RT4, and user authentication procedure RT7. Further, in the above embodiment, the controller 35 of the support device 6 performs the information acquisition procedure RT6 illustrated in FIGS. 7 and 8 in accordance with the information acquisition program previously stored in the memory in the controller 35 or the information memory 43. However, the present invention is not limited to this. The controller 35 of the support device 6 may install an information acquisition program read from a computer-readable storage medium storing it or obtained from the outside via a wired or wireless communication medium, such as a local area network, the Internet, or digital satellite broadcasting, and then perform the information acquisition procedure RT6. Further, in the above embodiment, the controller 50 of the smartphone 7 performs the communication processing procedure RT5 illustrated in FIGS. 7 and 8 in accordance with the communication processing program previously stored in the memory in the controller 50. However, the present invention is not limited to this. The controller 50 of the smartphone 7 may install a communication processing program read from a computer-readable storage medium storing it or obtained from the outside via a wired or wireless communication medium, such as a local area network, the Internet, or digital satellite broadcasting, and then perform the communication processing procedure RT5. Examples of the computer-readable storage media for installing the above various programs in the MFP 3, management server 5, support device 6, and smartphone 7 and making them executable are package media, such as flexible discs, Compact Disc Read-Only Memories (CD-ROMs), or Digital Versatile Discs (DVDs), or storage media, such as semiconductor memories or magnetic discs, in which various programs are stored temporarily or permanently. The various programs may be stored in the computer-readable storage media by using a wired or wireless communication medium, such as a local area network, the Internet, or digital satellite broadcasting. The various programs may also be stored in the computer-readable storage media via various communication interfaces, such as a router or modem.

(2-6) Sixth Modification

In the above embodiment, the MFP 3 is used as an image forming apparatus, but various other image forming apparatuses, such as a printer, a facsimile machine, or a copier, may be used. Further, in the above embodiment, the management server 5 is used as a management device, but various other devices, such as a device including the management server 5 and one or more of a computer, the web page publication device, and the support device 6, may be used. Further, in the above embodiment, the smartphone 7 is used as an information processing terminal, but various other devices, such as a personal computer, a mobile phone, a land-line phone, a tablet terminal, an information processing terminal for communicating with the management server 5 via the support device 6, or an information processing terminal for directly communicating with the management server 5, may be used. Thus, the configuration of the maintenance support system 1 may be modified.

(2-7) Seventh Modification

In the above embodiment, the information memory 13 of the MFP 3 is used as a first storage unit (or first memory) for storing terminal identification information identifying the information processing terminal, but various other memories, such as a memory detachably attached to the MFP 3, may be used.

(2-8) Eighth Modification

In the above embodiment, the controller 10 of the MFP 3 is used as a service request data generation unit (or service request data generator) for generating service request data including terminal identification information and sending it to the management device, but various other devices, such as a central processing unit (CPU), a digital signal processor (DSP), or a hardware circuit, may be used.

(2-9) Ninth Modification

In the above embodiment, the identification information issuer 29, registration processor 26, and controller 25 of the management server 5 are used as an information issuing unit (or information issuing processor) for, upon receiving service request data sent from the image forming apparatus, issuing receipt identification information and sending it to the image forming apparatus or the information processing terminal, but various other devices, such as a CPU, a DSP, or a hardware circuit, may be used.

(2-10) Tenth Modification

In the above embodiment, the registration information memory 27 of the management server 5 is used as a second storage unit (or second memory) for storing the terminal identification information included in the service request data and the receipt identification information issued by the information issuing unit in association with each other, but various other memories, such as a memory detachably attached to the management server 5, may be used.

(2-11) Eleventh Modification

In the above embodiment, the authentication processor 30 of the management server 5 is used as a processing unit (or processor) for, upon receiving the terminal identification information and receipt identification information sent from the information processing terminal, comparing the received terminal identification information and receipt identification information with the terminal identification information and receipt identification information stored in the second storage unit in association with each other, and outputting a result of the comparison, but various other devices, such as a microprocessor, CPU, or DSP, may be used.

(2-12) Twelfth Modification

In the above embodiment, the memory in the controller 50 of the smartphone 7 is used as a third storage unit (or third memory) for storing the terminal identification information, but various other memories, such as a semiconductor memory provided in the smartphone 7 separately from the controller 50, may be used.

(2-13) Thirteenth Modification

In the above embodiment, the display 52 of the smartphone 7 is used as a reception unit (or interface) for receiving input of the receipt identification information in accordance with operation by a user, but various other devices, such as push-operable operation keys, rotationally operable dial keys, a keyboard, or a pointing device, such as a mouse, may be used.

(2-14) Fourteenth Modification

In the above embodiment, the controller 50 of the smartphone 7 is used as a transmission unit (or transmitter) for sending the received receipt identification information and the terminal identification information stored in the third storage unit to an outside of the information processing terminal, but various other devices, such as a CPU, a DSP, or a hardware circuit, may be used. The transmission unit may send the receipt identification information and terminal identification information to the management server 5 directly or to another device, such as the support device 6, that communicates with the management server 5 (or to the management server 5 via another device, such as the support device 6).

(2-15) Fifteenth Modification

In the above embodiment, the controller 10 of the MFP 3 is used as a registration request data generation unit (or registration request data generator) for, in response to a request for registration for use of the service, generating registration request data including the terminal identification information and sending it to the management device, but various other devices, such as a CPU, a DSP, or a hardware circuit, may be used.

(2-16) Sixteenth Modification

In the above embodiment, the registration processor 26 of the management server 5 is used as a registration unit (or registration processor) for, upon receiving the registration request data sent from the image forming apparatus, storing in the second storage unit the terminal identification information included in the registration request data, but various other devices, such as a microprocessor, a CPU, or a DSP, may be used.

(2-17) Seventeenth Modification

The management server 5 may send receipt identification information to the smartphone 7, and the smartphone 7 may receive the receipt identification information from the management server 5 and notify the user of the receipt identification information by, for example, displaying it.

(2-18) Eighteenth Modification

In the above embodiment, the display 12 of the MFP 3 is used as an information notification unit (or information notifier) for giving notice of the receipt identification information sent from the management device, but various other devices, such as the display 52 or the voice input/output unit 55, may be used.

The present invention is applicable to a maintenance support system including an image forming apparatus, such as an MFP, a printer, a facsimile machine, or a copier, a management device, such as a computer or a management server, and a communication device, such as a personal computer, a mobile phone, a land-line phone, or a tablet terminal.

What is claimed is:

1. A maintenance support system for providing a service for supporting maintenance of an image forming apparatus, the maintenance support system comprising:
   the image forming apparatus;
   a management device; and
   an information processing terminal,
   wherein the image forming apparatus includes:
      a first memory configured to store terminal identification information identifying the information processing terminal; and
      a service request data generator configured to generate service request data including the terminal identification information stored in the first memory and send the service request data to the management device,
   wherein the management device includes:
      an information issuing processor configured to, upon receiving the service request data sent from the image forming apparatus, issue receipt identification information and send the receipt identification information to the image forming apparatus or the information processing terminal;
      a second memory configured to store the terminal identification information included in the service request data and the receipt identification information issued by the information issuing processor in association with each other; and
      a processor configured to, upon receiving the terminal identification information and the receipt identification information sent from the information processing terminal, compare the received terminal identification information and receipt identification information with the terminal identification information and receipt identification information stored in the second memory in association with each other, and output a result of the comparison, and
   wherein the information processing terminal includes:
      a third memory configured to store the terminal identification information;
      an interface configured to receive input of the receipt identification information in accordance with operation by a user; and
      a transmitter configured to send the received receipt identification information and the terminal identification information stored in the third memory to outside of the information processing terminal.

2. The maintenance support system of claim 1, wherein the image forming apparatus is configured to store, in the first memory, as the terminal identification information, information that is unique to the information processing terminal and is automatically sent by the information processing terminal during communication.

3. The maintenance support system of claim 1, wherein:
   the image forming apparatus further includes a registration request data generator configured to, in response to a request for registration for use of the service, generate registration request data including the terminal identification information stored in the first memory and send the registration request data to the management device;
   the service request data generator of the image forming apparatus is configured to, in response to a request for the service, generate the service request data including the terminal identification information and send the service request data to the management device;
   the management device further includes a registration processor configured to, upon receiving the registration request data sent from the image forming apparatus, store in the second memory the terminal identification information included in the registration request data; and
   the information issuing processor of the management device is configured to, upon receiving the service request data sent from the image forming apparatus, issue the receipt identification information if terminal identification information identical to the terminal identification information included in the service request data is stored in the second memory.

4. The maintenance support system of claim 1, wherein the information issuing processor of the management device is configured to, when issuing the receipt identification information, store in the second memory the receipt identification information in association with the terminal identification information, and then send the receipt identification information to the image forming apparatus or the information processing terminal.

5. The maintenance support system of claim 1, wherein the image forming apparatus further includes an information notifier configured to give notice of the receipt identification information sent from the management device.

6. The maintenance support system of claim 5, wherein the information notifier of the image forming apparatus is configured to give notice of the receipt identification information by displaying the receipt identification information.

7. The maintenance support system of claim 1, wherein the service request data generator of the image forming apparatus is configured to, in response to a request for the service, generate the service request data including the terminal identification information and apparatus state information consisting of apparatus setting information and operation history information of the image forming apparatus, and send the service request data to the management device; and
   wherein the information issuing processor of the management device is configured to, when issuing the receipt identification information in response to receipt of the service request data sent from the image forming apparatus, store in the second memory the receipt identification information and the apparatus state information included in the service request data in association with the terminal identification information.

8. The maintenance support system of claim 1, wherein the terminal identification information is a telephone number assigned to the information processing terminal.

9. The maintenance support system of claim 1, wherein the terminal identification information is an e-mail address held by the information processing terminal.

10. A service providing method of providing, by a maintenance support system comprising an image forming apparatus, a management device, and an information processing terminal, a service for supporting maintenance of the image forming apparatus, the service providing method comprising:
   by the image forming apparatus, generating service request data including terminal identification information that identifies the information processing terminal and is stored in a first memory, and sending the service request data to the management device;

by the management device, upon receiving the service request data sent from the image forming apparatus, issuing receipt identification information, sending the receipt identification information to the image forming apparatus or the information processing terminal, and storing in a second memory the terminal identification information included in the service request data and the receipt identification information in association with each other;

by the information processing terminal, receiving input of the receipt identification information in accordance with operation by a user, and sending the received receipt identification information and the terminal identification information stored in a third memory to an outside of the information processing terminal; and by the management device, upon receiving the terminal identification information and the receipt identification information sent from the information processing terminal, comparing the received terminal identification information and receipt identification information with the terminal identification information and receipt identification information stored in the second memory in association with each other, and outputting a result of the comparison.

11. A maintenance support system for providing a service for supporting maintenance of an image forming apparatus, the maintenance support system comprising:

the image forming apparatus;
a management device; and
an information processing terminal,
wherein the image forming apparatus includes:
a first memory configured to store terminal identification information identifying the information processing terminal; and
a processor configured to implement a service request data generator configured to generate service request data including the terminal identification information stored in the first memory and send the service request data to the management device, wherein the management device includes:
an information issuing processor configured to, upon receiving the service request data sent from the image forming apparatus, issue receipt identification information and send the receipt identification information to the image forming apparatus or the information processing terminal;
a second memory configured to store the terminal identification information included in the service request data and the receipt identification information issued by the information issuing processor in association with each other; and
a processor configured to, upon receiving the terminal identification information and the receipt identification information sent from the information processing terminal, compare the received terminal identification information and receipt identification information with the terminal identification information and receipt identification information stored in the second memory in association with each other, and output a result of the comparison, and wherein the information processing terminal includes:
a third memory configured to store the terminal identification information;
an operation device configured to receive input of the receipt identification information in accordance with operation by a user; and
a transmitter configured to send the received receipt identification information and the terminal identification information stored in the third memory to outside of the information processing terminal.

12. The maintenance support system of claim 11, wherein the image forming apparatus is configured to store, in the first memory, as the terminal identification information, information that is unique to the information processing terminal and is automatically sent by the information processing terminal during communication.

13. The maintenance support system of claim 11, wherein:
the image forming apparatus further includes a processor configured to implement a registration request data generator configured to, in response to a request for registration for use of the service, generate registration request data including the terminal identification information stored in the first memory and send the registration request data to the management device;
the service request data generator of the image forming apparatus is configured to, in response to a request for the service, generate the service request data including the terminal identification information and send the service request data to the management device;
the management device further includes a registration processor configured to, upon receiving the registration request data sent from the image forming apparatus, store in the second memory the terminal identification information included in the registration request data; and
the information issuing processor of the management device is configured to, upon receiving the service request data sent from the image forming apparatus, issue the receipt identification information if terminal identification information identical to the terminal identification information included in the service request data is stored in the second memory.

14. The maintenance support system of claim 11, wherein the information issuing processor of the management device is configured to, when issuing the receipt identification information, store in the second memory the receipt identification information in association with the terminal identification information, and then send the receipt identification information to the image forming apparatus or the information processing terminal.

15. The maintenance support system of claim 11, wherein the image forming apparatus further includes a notification device configured to give at least one of visible or audible notice of the receipt identification information sent from the management device.

16. The maintenance support system of claim 15, wherein the notification device of the image forming apparatus is configured to give notice of the receipt identification information by displaying the receipt identification information.

17. The maintenance support system of claim 11, wherein the service request data generator of the image forming apparatus is configured to, in response to a request for the service, generate the service request data including the terminal identification information and apparatus state information consisting of apparatus setting information and operation history information of the image forming apparatus, and send the service request data to the management device; and
wherein the information issuing processor of the management device is configured to, when issuing the receipt identification information in response to receipt of the service request data sent from the image forming apparatus, store in the second memory the receipt identification information and the apparatus state information included in the service request data in association with the terminal identification information.

18. The maintenance support system of claim 11, wherein the terminal identification information is a telephone number assigned to the information processing terminal.

19. The maintenance support system of claim 11, wherein the terminal identification information is an e-mail address held by the information processing terminal.

\* \* \* \* \*